US007096240B1

(12) United States Patent
Absar et al.

(10) Patent No.: US 7,096,240 B1
(45) Date of Patent: Aug. 22, 2006

(54) CHANNEL COUPLING FOR AN AC-3 ENCODER

(75) Inventors: Mohammed Javed Absar, Singapore (SG); Sapna George, Singapore (SG)

(73) Assignee: STMicroelectronics Asia Pacific PTE Ltd., Singapore (SG)

( * ) Notice: Subject to any disclaimer, the term of this patent is extended or adjusted under 35 U.S.C. 154(b) by 0 days.

(21) Appl. No.: 10/129,041

(22) PCT Filed: Oct. 30, 1999

(86) PCT No.: PCT/SG99/00110

§ 371 (c)(1), (2), (4) Date: Oct. 9, 2002

(87) PCT Pub. No.: WO01/33726

PCT Pub. Date: May 10, 2001

(51) Int. Cl.
*G10L 19/44* (2006.01)
*H04B 1/66* (2006.01)

(52) U.S. Cl. ...................................................... 708/203

(58) Field of Classification Search ................ 708/203
See application file for complete search history.

(56) References Cited

U.S. PATENT DOCUMENTS 5,844,940 A * 12/1998 Goodson et al. ............ 375/222
6,591,241 B1 * 7/2003 Absar et al. ................ 704/504

FOREIGN PATENT DOCUMENTS

EP 0 329 339 A2 8/1989
WO WO 99/33194 7/1999
WO WO 00/25249 5/2000

OTHER PUBLICATIONS

Vernon, S., "Design and Implementation of AC-3 Coders," *IEEE Trans. on Consumer Electronics*, 41(3):754-759, Aug. 1995.
Liu, C-M. et al., "Design of the Coupling Schemes for the AC-3 Coder in Stereo Coding," *IEEE Trans. on Consumer Electronics*, 44(3):878-882, Aug. 1998.

* cited by examiner

*Primary Examiner*—D. H. Malzahn
(74) *Attorney, Agent, or Firm*—Lisa K. Jorgenson; Robert Iannucci; Seed IP Law Group PLLC

(57) ABSTRACT

Channel coupling for an AC-3 encoder, using mixed precision computations and 16-bit coupling coefficient calculations for channels with 32-bit frequency coefficients.

20 Claims, 8 Drawing Sheets

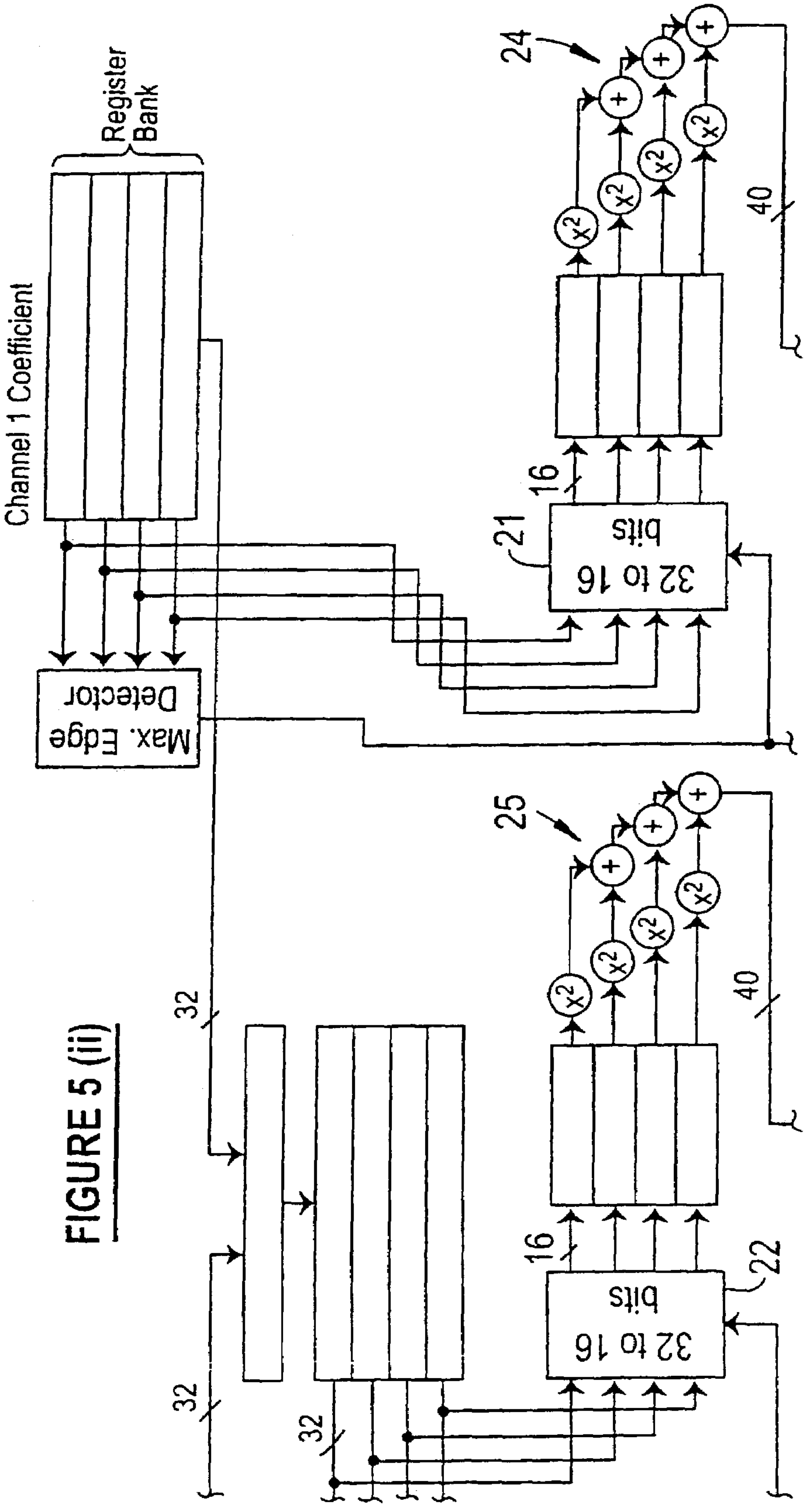
FIGURE 5 (ii)

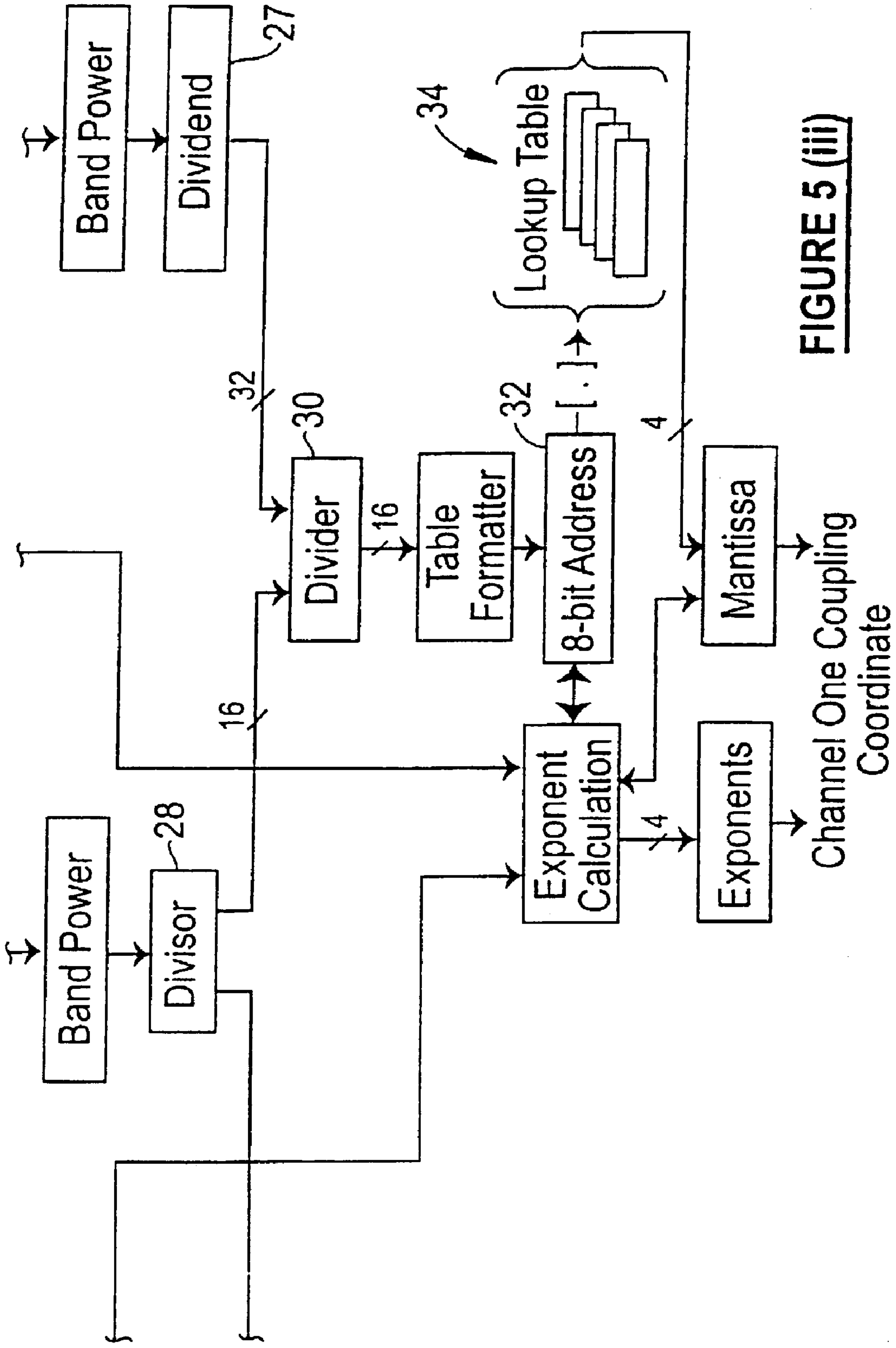
FIGURE 5 (iii)

CHANNEL COUPLING FOR AN AC-3 ENCODER

TECHNICAL FIELD

This invention is applicable in the field of an AC-3 Encoder and in particular to channel coupling on a 16-bit fixed point DSP.

BACKGROUND OF THE INVENTION

Recent years have witnessed an unprecedented increase in the use of psycho-acoustic models for the design of audio coders. This has led to high compression ratios while keeping audible degradation in the compressed signal to a minimum. Description of one such method, which is the centre of current discussion, can be found in the ATSC Standard, "Digital Audio Compression (AC-3) Standard", Document A/52, 20 Dec., 1995.

In the AC-3 encoder the input time domain signal is sectioned into frames, each frame comprising of six audio blocks. Since AC-3 is a transform coder, the time domain signal in each block is converted to the frequency domain using a bank of filters. The frequency domain coefficients, thus generated, are next converted to fixed point representation. In fixed point syntax, each coefficient is represented as a mantissa and an exponent. The bulk of the compressed bitstream transmitted to the decoder comprises these exponents and mantissas.

Each mantissa must be truncated to a fixed or variable number of decimal places. The number of bits to be used for coding each mantissa is to be obtained from a bit allocation algorithm which may be based on the masking property of the human auditory system. Lower number of bits result in higher compression ratio because less space is required to transmit the coefficients. However, this may cause high quantization error leading to audible distortion. A good distribution of available bits to each mantissa forms the core of the advanced audio coders.

Further compression can be successfully obtained in AC-3 by use of a technique called coupling. Coupling takes advantage of the way the human ear determines directionality for very high frequency signals, in order to allow a reduction in the amount of data necessary to code audio signals. At high audio frequency (approximately above 2 KHz.), the human ear is physically unable to detect individual cycles of an audio waveform, and instead responds to the envelope of the waveform. Consequently, the coder combines the high frequency coefficients of the individual channels to form a common coupling channel. The original channels combined to form the said coupling channel are referred to as coupled channels.

The translation of the AC-3 Encoder Standard on to the firmware of a DSP-Core involves several phases. Firstly, the essential compression algorithm blocks for the AC-3 Encoder have to be designed. After individual blocks are completed, they are integrated into an encoding system which receives a PCM (pulse code modulated) stream, processes the signal applying signal processing techniques such as transient detection, frequency transformation, psychoacoustic analysis (coupling & bit-allocation), and produces a compressed stream in the format of the AC-3 Standard.

The coded stream should be capable of being decompressed by any standard AC-3 Decoder and the PCM stream generated thereby should be comparable in audio quality to the original music stream. If the original stream and the decompressed stream are indistinguishable in audible quality (at reasonable level of compression) the development moves to the third phase. If the quality is not transparent (indistinguishable), further algorithm development and improvements continue.

In the third phase the algorithms are implemented using the word-length specifications of the target DSP-Core. Most commercial DSP-Cores allow only fixed point arithmetic (since floating point engine is costly in terms of area). Consequently the algorithm is translated to a fixed point solution. The word-length used is usually dictated by the ALU (arithmetic-logic unit) capabilities and bus-width of the target core. For example AC-3 Encoder on Motorala's 56000 would use 24-bit precision since it is a 24-bit Core. Similarly, for implementation on Zoran's ZR38000 which has 20-bit data path, 20-bit precision would be used [4].

If, for example, 20-bit precision is discovered to provide unacceptable level of sound quality, the provision to use double precision always exist. In this case each piece of data is stored and processed as two segments, lower and upper words, each of 20-bit length. The accuracy of implementation is doubled but so is the computational complexity—double precision multiplication could require 6 or more cycles while single precision multiplication and addition (MAC) requires only a single cycle).

Twenty four bit AC-3 Encoders are known to provide sufficient quality. However 16-bit single precision AC-3 Encoder quality is viewed as terribly poor. Consequently few or no attempts (at least not published) to use 16-bit Core for AC-3 Encoder has been made to date.

Coupling is one of the most difficult and tricky algorithm to implement on a fixed-point processor and it becomes even more so when attempted on a 16-bit processor. It can be quite computationally demanding and if not implemented intelligently can lower the accuracy of the represented signal, thereby effecting final quality of the reproduced (decoded) signal.

Single precision 16-bit implementation of AC-3 Encoder is generally considered unacceptable in quality and such a product would be at a distinct disadvantage in the consumer market. Double precision implementation is too computationally costly. It has been estimated that such an implementation would require over 120 MIPS (million instruction per second). This exceeds what most commercial DSPs can provide (moreover, extra MIPS are always needed for system software and value-added features). One of the most difficult section of AC-3 for a 16-bit processor is the Coupling. So the question is: is it possible to implement high quality AC-3 Encoder Coupling on a 16-bit DSP with reasonable computational requirement ?

SUMMARY OF THE INVENTION

The invention seeks to use single precision implementation, in particular 16-bit reduced bit computation calculating coupling coefficients of double precision (32-bit) frequency coefficients, thereby rendering the 16-bit AC-3 encoder suitable for commercial purposes. The invention does, of course, have application to encoders with larger bit capacity.

In accordance with the invention, there is provided a coupling process for use in reduced bit processing, including calculating a power value of a coupled channel by normalising frequency coefficients within a channel band to produce mantissas with respective normalisation values represented by a prescribed number of reduced bits, calculating a sum of the square of the values and post-shifting the resultant sum to obtain a power value.

In another aspect, there is provided a signal processor for a coupling process having:

first and second coupled channel register;

a coupling channel means for combining frequency coefficients of the first and second coupled channel;

a coupling coordinate calculation means including:

normalisation means for analysing mantissas of the frequency coefficients in a channel band in each of the channels, the normalisation means producing first normalisation values for each respective channel represented by a prescribed number of reduced bits;

calculation means for determining a sum of the square of values for each channel;

shifting means for post-shifting each sum to obtain a power value for each of the channels;

divider means for providing a mantissa quotient by dividing the post shifted sum of the first and second coupled channels by the post shifted sum of the coupling channel, reduced to a prescribed number of reduced bits; and a lookup table for providing square root values of the mantissa quotients, the square root values representing a mantissa component of the coupling coordinate of each of the first and second coupled channels.

Preferably, the frequency coefficients are each 32-bit and are assumed to be stored in two 16-bit registers. For phase and coupling strategy calculations the upper 16-bit of the data is utilized. Once the strategy for combining the coupled channel to form the coupling channel is known, the combining process uses the full 32-bit data. The computation is reduced while the accuracy is still high. Simple truncation of the upper 16-bit of the 32-bit data for the phase and coupling strategy calculation leads to poor result (only 80% of the time the strategy matches with that from the floating point version). If block exponent method is used the strategy is 97% of the time exactly same as the floating point.

Similarly, power values necessary for coupling co-ordinate calculations are derived from 16-bit coefficients (obtained from normalisation followed by truncation of 32-bit coefficients). Square root of the ratio of power values is obtained for the mantissa part by a table look-up The exponent, derived from shift values used for normalising coupling and coupled channel coefficients, is converted to an even number and divided by two. This together with the table look-up for mantissa is equivalent to square root of the actual power ratio in the floating point method used for calculating coupling-coordinate.

BRIEF DESCRIPTION OF THE DRAWINGS

The invention is more fully described, by way of non-limiting example only, with reference to the accompanying drawings, in which.

DETAILED DESCRIPTION OF A PREFERRED EMBODIMENT

The input to the AC-3 audio encoder comprises a stream of digitised samples of the time domain audio signal. If the stream is multi-channel the samples of each channel appear in interleaved format. The output of the audio encoder is a sequence of synchronisation frames of the serial coded audio bit stream. For advanced audio encoders, such as the AC-3, the compression ratio can be over ten.

Figure 1:
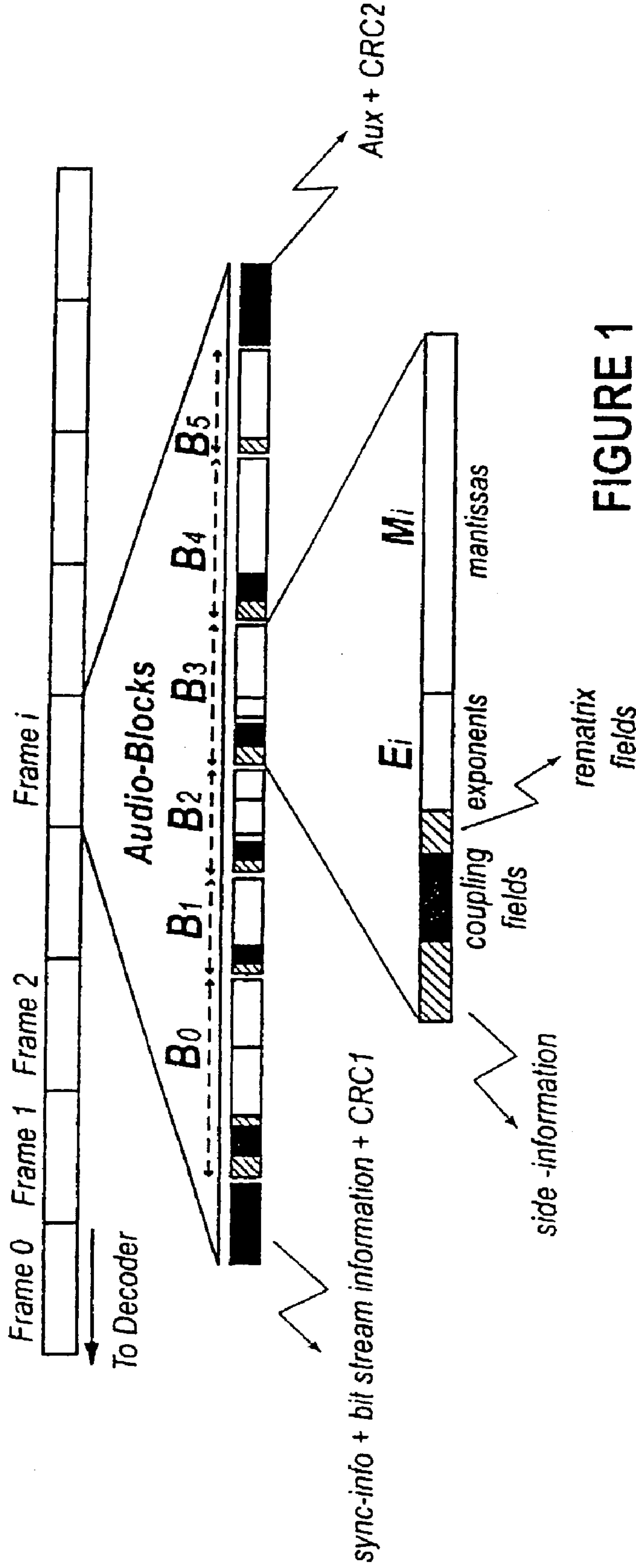
FIG. 1 is a representation of an AC-3 frame.

FIG. 1 shows the general format of an AC-3 frame. A frame consists of the following distinct data fields:

a synchronisation header (sync information, frame size code)

the bit-stream information (information pertaining to the whole frame)

the 6 blocks of packed audio data two CRC error checks

The bulk of the frame size is consumed by the 6 blocks of audio data. Each block is a decodable entity, however not all information to decode a particular block is necessarily included in the block. If information needed to decode blocks can be shared across blocks, then that information is only transmitted as part of the first block in which it is used, and the decoder reuses the same information to decode later blocks.

All information which may be conditionally included in a block is always included in the first block. Thus, a frame is made to be an independent entity: there is no inter-frame data sharing. This facilitates splicing of encoded data at the frame level, and rapid recovery from transmission error. Since not all necessary information is included in each block, the individual blocks in a frame may vary in size, with the constraint that the sum of all blocks must fit the frame size.

A. System OverView

Like the AC-2 single channel coding technology from which it derives, AC-3 is fundamentally an adaptive transform-based coder using a frequency-linear, critically sampled filterbank based on the Princen Bradley Time Domain Aliasing Cancellation (TDAC) J. P. Princen and A. B. Bradley, "*Analysis/Synthesis Filter Bank Design Based on Time Domain Aliasing Cancellation*", *IEEE Trans. Acoust., Speech, Signal Processing, vol. ASSP*-34, no. 5, pp. 1153–1161, October 1986.

A.1 Major Processing Blocks

Figure 2:
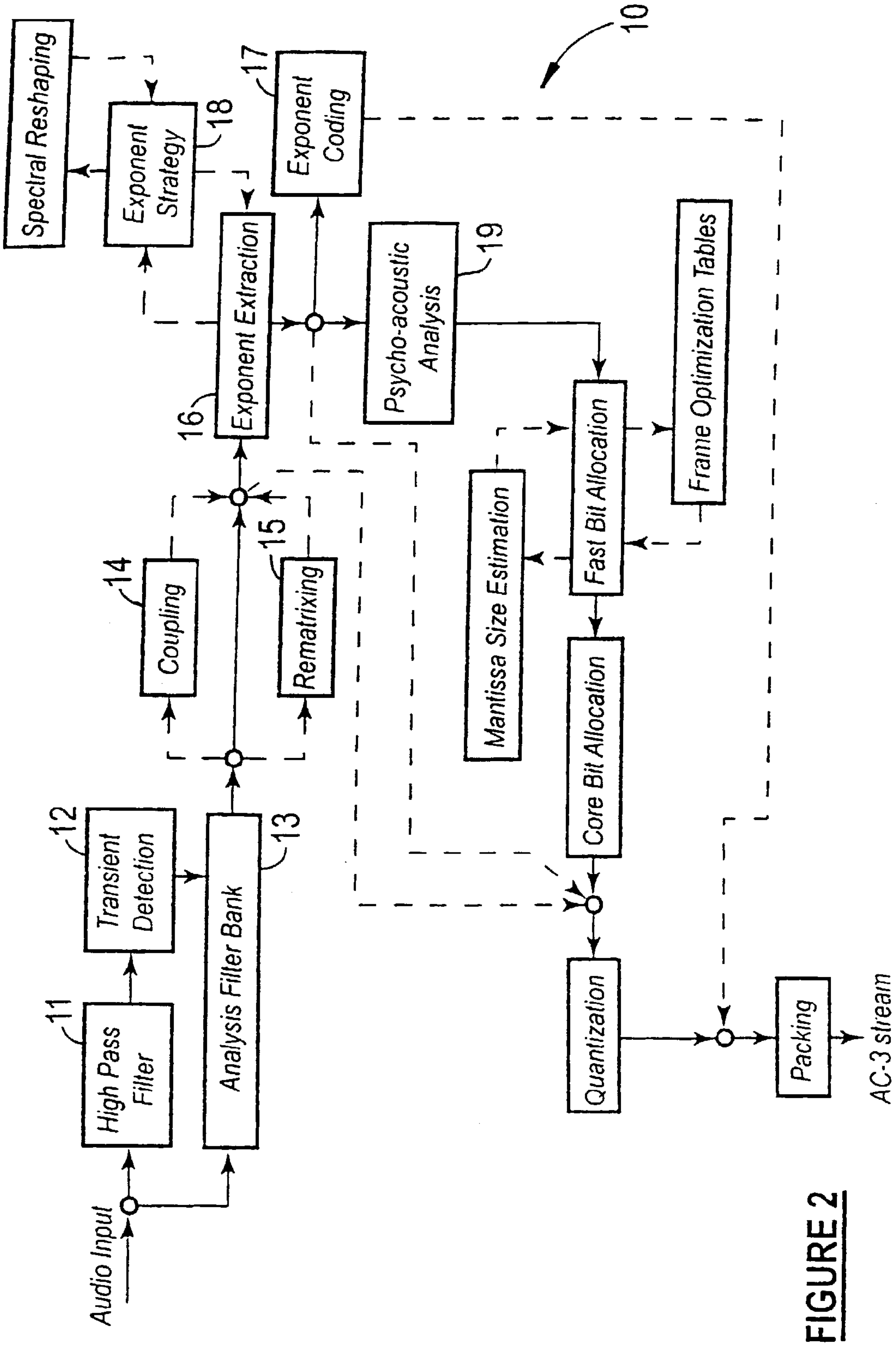
FIG. 2 is a schematic representation of an AC-3 encoder.

The major processing blocks of the AC-3 encoder are shown in FIG. 2. A brief description is provided below, with special emphasis on issues which are relevant to the subject of this patent.

A. 1.1 Input Format

AC-3 is a block structured coder 10, so one or more blocks of time domain signal, typically 512 samples per block and channel, are collected in an input buffer before proceeding with additional processing.

A. 1.2 Transient Detection

Block of signal for each channel is next analysed with a high pass filter 11 to detect presence of transients 12. This information is used to adjust the block size of the TDAC (time domain aliasing cancellation) filter bank 13, restricting quantization noise associated with the transient within a small temporal region about the transient. In presence of transient the bit 'blksw' for the channel in the encoded bit stream in the particular audio block is set.

A.1.3 TDAC Filter

Each channel's time domain input signal is individually windowed and filtered with a TDAC-based analysis filter bank to generate frequency domain coefficients. If the blksw bit is set, meaning that a transient was detected for the block, then two short transforms of length 256 each are taken, which increases the temporal resolution of the signal. If not set, a single long transform of length 512 is taken, thereby providing a high spectral resolution.

The number of bits to be used for coding each coefficient needs to be obtained next. Lower number of bits result in higher compression ratio because less space is required to transmit the coefficients. However, this may cause high quantization error leading to audible distortion. A good distribution of available bits to each coefficient forms the core of the advanced audio coders.

A.1.4 Coupling

Further compression can be achieved in AC-3 by use of a technique known as coupling. Coupling can occur at block 14 takes advantage of the way the human ear determines directionality for very high frequency signals. At high audio frequency (approx. above 4 KHz.), the ear is physically unable to detect individual cycles of an audio waveform and instead responds to the envelope of the waveform. Consequently, the encoder combines the high frequency coefficients of the individual channels to form a common coupling channel. The original channels combined to form the coupling channel are called the coupled channel.

The most basic encoder can form the coupling channel by simply taking the average of all the individual channel coefficients. A more sophisticated encoder could alter the signs of the individual channels before adding them into the sum to avoid phase cancellation.

The generated coupling channel is next sectioned into a number of bands. For each such band and each coupling channel a coupling co-ordinate is transmitted to the decoder. To obtain the high frequency coefficients in any band, for a particular coupled channel, from the coupling channel, the decoder multiplies the coupling channel coefficients in that frequency band by the coupling co-ordinate of that channel for that particular frequency band. For a dual channel encoder a phase correction information is also sent for each frequency band of the coupling channel.

A. 1.5 Rematrixing

An additional process, rematrixing which occurs at 15, is invoked in the special case that the encoder is processing two channels only. The sum and difference of the two signals from each channel are calculated on a band by band basis, and if, in a given band, the level disparity between the derived (matrixed) signal pair is greater than the corresponding level of the original signal, the matrix pair is chosen instead. More bits are provided in the bit stream to indicate this condition, in response to which the decoder performs a complementary unmatrixing operation to restore the original signals. The rematrix bits are omitted if the coded channels are more than two.

The benefit of this technique is that it avoids directional unmasking if the decoded signals are subsequently processed by a matrix surround processor, such as Dolby Prologic decoder.

A.1.6 Conversion to Floating Point

The transformed values, which may have undergone rematrix and coupling process, are converted to a specific floating point representation, resulting in separate arrays of binary exponents and mantissas. This floating point arrangement is maintained through out the remainder of the coding process, until just prior to the decoder's inverse transform, and provides 144 dB dynamic range, as well as allows AC-3 to be implemented on either fixed or floating point hardware.

Coded audio information consists essentially of separate representation of the exponent and mantissas arrays. The remaining coding process focuses individually on reducing the exponent and mantissa data rate.

The exponents are extracted at 16 and coded at 17 using one of the exponent coding strategies derived at 18. Each mantissa is truncated to a fixed number of binary places. The number of bits to be used for coding each bit allocation algorithm which is based on the masking property of the human auditory system.

A. 1.7 Exponent Coding Strategy

Exponent values in AC-3 are allowed to range from 0 to −24. The exponent acts as a scale factor for each mantissa. Exponents for coefficients which have more than 24 leading zeros are fixed at −24 and the corresponding mantissas are allowed to have leading zeros.

AC-3 bit stream contains exponents for independent, coupled and the coupling channels. Exponent information may be shared across blocks within a frame, so blocks 1 through 5 may reuse exponents from previous blocks.

AC-3 exponent transmission employs differential coding technique, in which the exponents for a channel are differentially coded across frequency. The first exponent is always sent as an absolute value. The value indicates the number of leading zeros of the first transform coefficient. Successive exponents are sent as differential values which must be added to the prior exponent value to form the next actual exponent value.

The differential encoded exponents are next combined into groups. The grouping is done by one of the three methods: D15, D25 and D45. These together with 'reuse' are referred to as exponent strategies. The number of exponents in each group depends only on the exponent strategy. In the D15 mode, each group is formed from three exponents. In D45 four exponents are represented by one differential value. Next, three consecutive such representative differential values are grouped together to form one group. Each group always comprises of 7 bits. In case the strategy is 'reuse' for a channel in a block, then no exponents are sent for that channel and the decoder reuses the exponents last sent for this channel.

Choice of the suitable strategy for exponent coding forms a crucial aspect of AC-3. D15 provides the highest accuracy but is low in compression. On the other hand transmitting only one exponent set for a channel in the frame (in the first audio block of the frame) and attempting to 'reuse' the same exponents for the next five audio block, can lead to high exponent compression but also sometimes very audible distortion.

A.1.8 Bit Allocation for Mantissas

The bit allocation algorithm analyses the spectral envelope of the audio signal being coded, with respect to masking effects, to determine the number of bits to assign to each transform coefficient mantissa. In the encoder, the bit allocation is recommended to be performed globally on the ensemble of channels as an entity, from a common bit pool.

The bit allocation routine contains a psycho-analysis 19 such as a parametric model of the human hearing for estimating a noise level threshold, expressed as a function of frequency, which separates audible from inaudible spectral components. Various parameters of the hearing model can be adjusted by the encoder depending upon the signal characteristic. For example, a prototype masking curve is defined in terms of two piece wise continuous line segment, each with its own slope and y-intercept.

B. Word-Length Requirements of Processing Blocks

Floating point arithmetic usually use IEEE 754 (32 bits: 24-bit mantissas, 7-bit exponent & 1 sign bit) which is adequate for high quality AC-3 encoding. Work-stations like Sun SPARCstation 20 can provide much higher precision (e.g. double is 8 bytes). However, floating point units require more chip area and consequently most DSP Processors use fixed point arithmetic. The AC-3 Encoder is often intended to be a part of a consumer product e.g. DVD (Digital Versatile Disk) where cost (chip area) is an important factor.

Being aware of the cost versus quality issue in the development of AC-3 Dolby Labs. ensured that the algorithms could work well even on fixed-point processors.

The AC-3 Encoder has been implemented on 24-bit processors like the Motorola 56000 and has met with much commercial success. The quality of AC-3 Encoder on a 16-bit processor, though universally assumed to be of low quality, no adequate study (as yet not published) has been conducted to benchmark the quality or compare it with the floating point version.

Using double precision (32-bit) to implement the encoder on a 16-bit processor can lead to high quality (even more than the 24-bit version). However, double precision arithmetic is very computationally expensive (e.g. on D950 single precision multiplication takes 1 cycle while double precision requires 6 cycles). Rather than performing single or double precision throughout the whole cycle of processing, an analysis can be performed to determine adequate precision requirement for each stage of computation.

In the investigation that follows, for simplicity of expression (and to avoid repeating the same thing), the following convention has been adopted. Notation x-y (set A:set B) implies that for the process, data elements within Set A were truncated to x bits while the Set B elements were y bits long. For example, 16–32(data:window) implies that for windowing—data was truncated to 16 bits and the window coefficient to 32 bits. When appearing without any parenthesised explanation, e.g. x-y: explanation of the implied meaning will be provided. If no explanation is provided the meaning must be clear from the context and the brevity of expression has taken precedence over repetition of the same idea.

MIPS and Quality have been made subject to the statistics obtained.

C. Coupling on a 16-Bit DSP

Assume that the frequency domain coefficients are identified as:

$a_i$, for the first coupled channel $b_i$, for the second coupled channel, $c_i$, for the coupling channel, For each sub-band, the value $\Sigma_i a_i * b_i$ is computed, index i extending over the frequency range of the sub-band. If $\Sigma_i a_i * b_i > 0$, coupling for this sub-band is performed as $c_i=(a_i+b_i)/2$.

Similarly, if $c_i=(a_i+b_i)/2$, then coupling strategy for the sub-band is as $c_i=(a_i+b_i)/2$.

Adjacent sub-bands using identical coupling strategies may be grouped together to form one or more coupling bands. However, sub-bands with different coupling strategies must not be banded together. If overall coupling strategy for a band is $c_i=(a_i+b_i)/2$, i.e. for all sub-bands comprising the band the phase flag for the band is set to +1, else it is set to −1.

The computational requirements for the coupling process is quite appreciable, which makes selection of right precision tricky. The input to the coupling process is the channel coefficients each of 32-bit length. The coupling progresses in several stages. For each such stage appropriate word length must be determined.

C. 1 Coupling Channel Generation Strategy

As explained in section before, the coupling channel generation strategy is linked to the product $\Sigma a_i * b_i$, where $a_i$ and $b_i$ are the two coupled channel coefficients within the band in question. Although 32—32 (double precision) computation for the dot product would lead to more accurate results, it will be quite computationally prohibitive. The important fact to realise is that the output of this stage only influences how the coupling channel is generated, not the accuracy of the coefficients themselves. If the error from 16-bit computation is not appreciable large, computational burden can be decreased.

Figure 3:
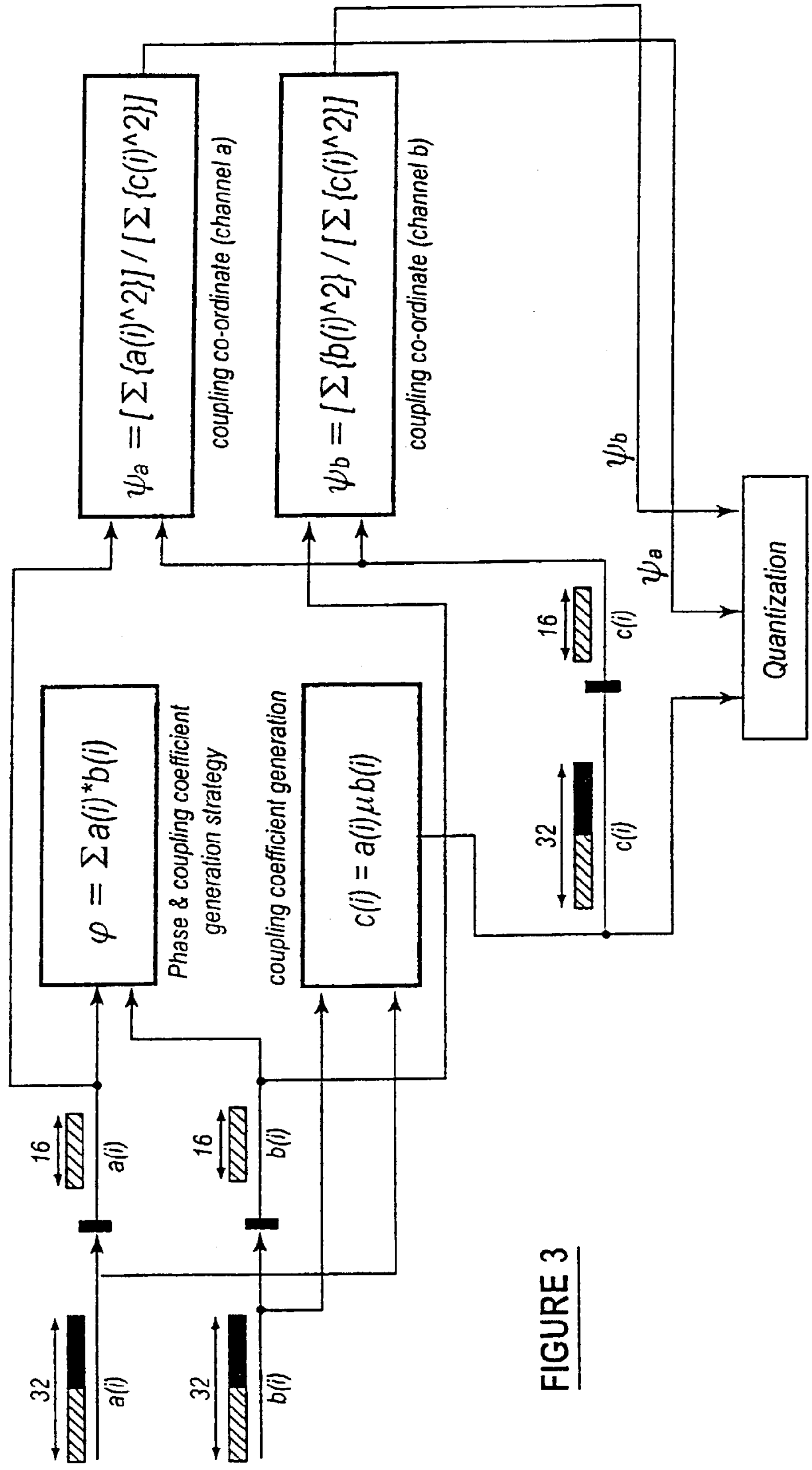
FIG. 3 illustrates a coupling process.

As shown in FIG. 3, for phase estimation and coupling coefficient generation strategy upper 16-bit of the full 32-bit data from the Frequency Transformation stage may be used. The actual coupling $c_i=(a_i \pm b_i)/2$ is done using 32—32 ($a_i$:$b_i$).

TABLE 1

Coupling Strategy: the 24—24 and the 16—16 approach are compared (%) with the floating point version. While 24—24 gives superior result, the 16—16 fares badly.

| | Band 0 | | Band 1 | | Band 2 | | Band 3 | |
|---|---|---|---|---|---|---|---|---|
| | 16—16 | 24—24 | 16—16 | 24—24 | 16—16 | 24—24 | 16—16 | 24—24 |
| Drums | 84.1 | 99.7 | 75 | 99.8 | 90 | 100 | 91 | 100 |
| Harp | 75.2 | 99.2 | 72.7 | 99.4 | 78.1 | 99.5 | 75.1 | 99.5 |
| Piano | 88.2 | 99.9 | 84 | 99.4 | 86 | 99.2 | 76 | 98.7 |
| Saxophone | 73.6 | 99.9 | 56 | 99.8 | 76.2 | 99.7 | 81.4 | 9.8 |
| Vocal | 98.6 | 97.8 | 97.8 | 100 | 98.6 | 99.8 | 96.5 | 100 |

Figure 4:
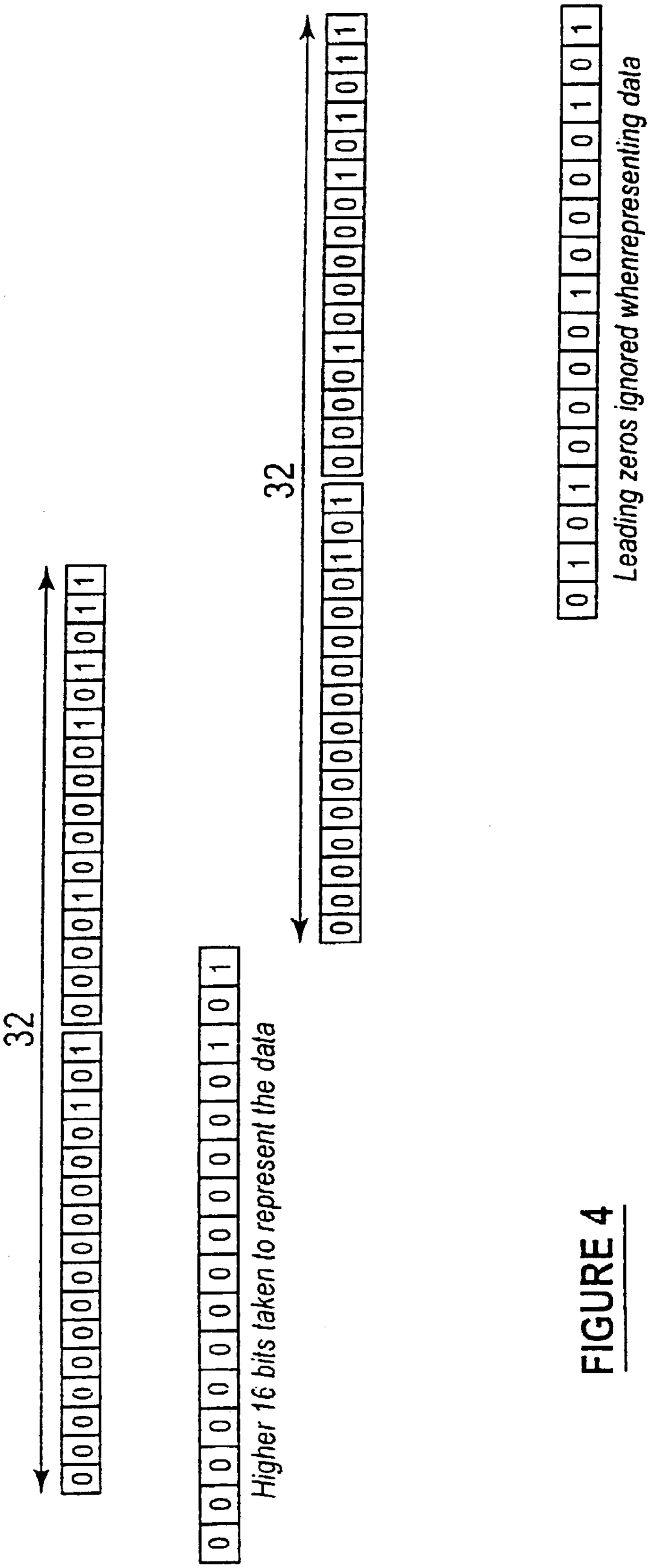
FIG. 4 is a representation of a mantissa of a frequency component.

The results for 16—16 are shown in the table of FIG. 4. Clearly, the results are not as desired. Upon analysis of the reason for the low performance it was discovered that usually the coupling coefficients are low value. Even though the coupling coefficient is represented by 32-bits the higher 16-bits are normally almost all zeros. Therefore simple truncation of the upper 16 bits produce poor results. A variation of the block exponent strategy is used to improve the results.

Figure 5:
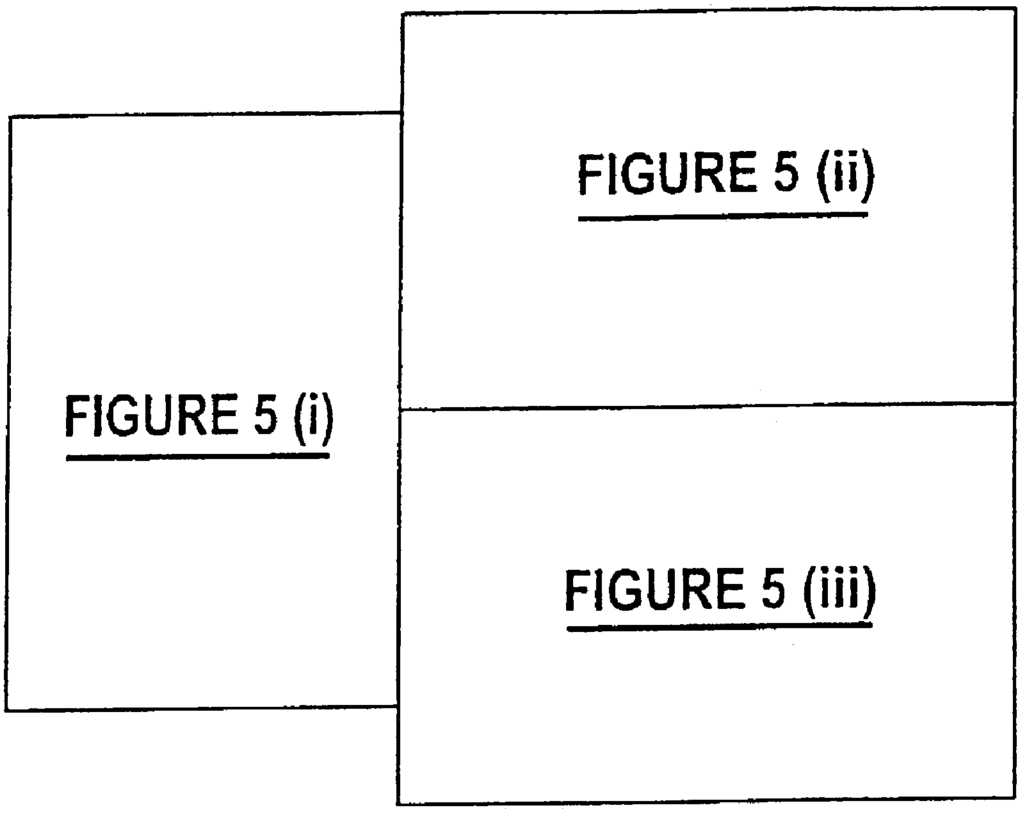
FIG. 5 is a schematic representation of a coupling co-ordinate calculation.
Figure 5:
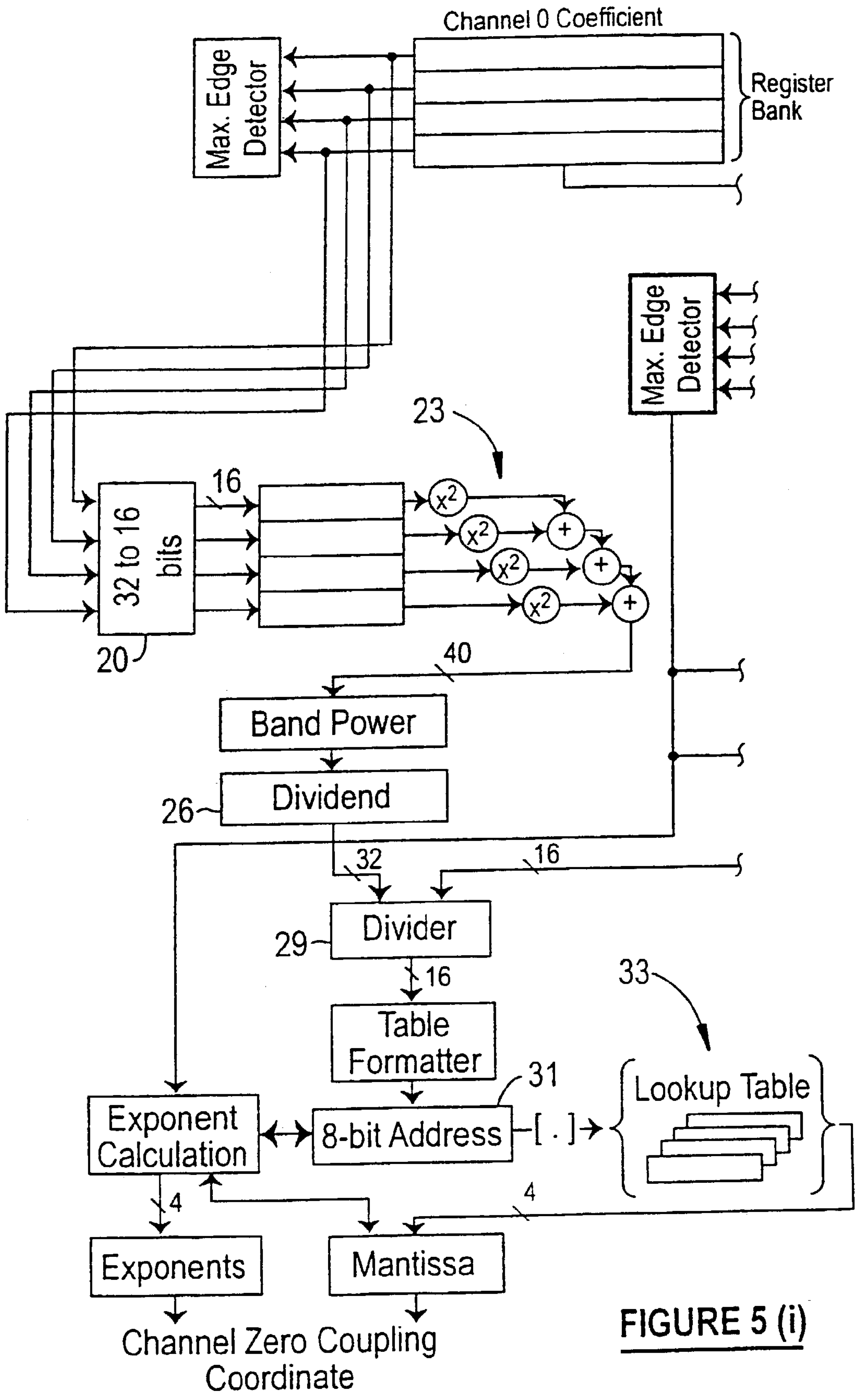

FIG. 5 below shows a pre-processing stage before truncation of the 32-bit to 16-bit for the phase estimation, coupling coefficient generation strategy and calculation of the coupling co-ordinates. The coefficients within the band (or sub-band depending on the level of processing) are analysed to find the minimum number of leading zeros (in actual implementation the maximum absolute rather than leading zeros are used for scaling). The entire coefficient set within the band is then shifted (equivalent to multiplication) to the left and then the remaining upper 16 bits are utilised for the processing. Note that for the phase estimation and coupling strategy the multiplication factor has no affect as long as both the left and right channels within the band have been shifted by same number of bits.

Similar approach of 16—16 ($a_i$:$b_i$) is used for the coupling co-ordinate generation. However, the final division involved in the co-ordinate generation must preferably be done with highest precision possible. For this it is recommended that floating point operation be emulated, that is the exponents (equivalent to number of leading zero) and mantissa (remaining 16 bits after removal of leading zeros). The division can then be performed using the best possible method as provided by the processor to provide maximum accuracy.

The scaling factor will have to be compensated in the exponent value for the coupling co-ordinate. With this approach the performance of phase estimation with 16—16 bit processing improves drastically as shown in Table 2, as compared to Table 1.

TABLE 2

Coupling strategy for the two implementation (16—16) and (24—24) as compared (in percentage %) to the floating point version. By use of block exponent method the accuracy of the 16—16 version is much improved compared to the figures in Table 1.

| | Band 0 | | Band 1 | | Band 2 | | Band 3 | |
|---|---|---|---|---|---|---|---|---|
| | 16—16 | 24—24 | 16—16 | 24—24 | 16—16 | 24—24 | 16—16 | 24—24 |
| Drums | 100 | 99.7 | 99.8 | 99.8 | 100 | 100 | 99 | 100 |
| Harp | 99.7 | 99.2 | 99.4 | 99.4 | 99.5 | 99.5 | 99.57 | 99.5 |
| Piano | 100 | 99.9 | 99.9 | 99.4 | 99.9 | 99.2 | 100 | 98.7 |
| Saxophone | 100 | 99.9 | 100 | 99.8 | 76.2 | 99 | 81.4 | 100 |
| Vocal | 100 | 98.8 | 97.8 | 100 | 99.4 | 99.8 | 99.6 | 100 |

Since coupling co-ordinates anyway need to be converted to floating point format (exponent and mantissa) for final transmission, this approach has dual benefit.

For the coupling co-ordinate generation phase, both the coupling and the coupled channels should have the same multiplication factor so that they cancel out. Alternately, if floating point emulation is used as recommended above, the coupling and coupled channels may be on different scale. The difference in scale is compensated in the exponent value of the final coupling co-ordinate. Consider for the sake of the example that a band has only 4 bins, 96 . . . 99:

a[96]=(0000 0000 0000 0000 1100 0000 0000 1001)

b[96]=(0000 0000 0000 0000 0000 0000 0000 0100)

c[96]=(0000 0000 0000 0000 0110 0000 0000 0110)

a[97]=(0000 0000 0000 0000 1100 0000 0000 0000)

b[97]=(0000 0000 0000 0000 0001 0000 0000 1000)

c[97]=(0000 0000 0000 0000 0110 1000 0000 0100)

a[98]=(0000 0000 0000 0000 0000 0000 0000 1000)

b[98]=(0000 0000 0000 0000 0000 0000 0000 1100)

c[98]=(0000 0000 0000 0000 0000 0000 0000 1010)

a[99]=(0000 0000 0000 0000 1100 0000 0000 1000)

b[99]=(0000 0000 0000 0001 0000 0000 0000 1100)

c[99]=(0000 0000 0000 0000 1110 0000 0000 1010)

*Note: for this example :: ci=(ai+bi)12

Considering only the upper 16-bit will lead to poor result. For example coupling co-ordinate $\Psi a=(\Sigma a^2/\Sigma b^2)$ formula will be zero, thereby wiping away all frequency components within the band for channel a when the coupling coefficient is multiplied by the coupling co-ordinate at the decoder to reproduce the coefficients for channel a. However by removing the leading zeros, the new coefficients for channel a will be, as given below, on which more meaning measurements can be performed a[96]=(00 1100 0000 0000 10)

a[97]=(00 1100 0000 0000 00)

a[98]=(00 0000 0000 0000 10)

a[99]=(00 1100 0000 0000 10)

C.2 Coupling Co-Ordinate Calculations

The equation for coupling co-ordinate calculations for a band is as follows $$\psi = \sqrt{\frac{\Sigma[a_i^2]}{\Sigma[c_i^2]}}$$

$a_i$: Frequency coefficients, within the coupling band, for coupled channel (a)

$a_i$: Frequency coefficients, within the coupling band, for coupling channel

FIG. 5. shows the steps for coupling co-ordinate calculations. For each channel (channel 0, channel 1 and coupling channel) 32-bit coefficients within the band in question are analysed at 20,21,22 to determine the normalisation value. This removes leading zeros (for positive values) and leading ones (for negative values) so that the next stage of processing does not give poor result in presence of low power signals. After normalisation, the 32-bit coefficients values are truncated to 16-bits. The power, defined as the sum of square of all coefficients within the band, is computed at 23,24,25 using the 16-bit values. The result is 40-bit long and so must be post-shifted at 26,27 to constrain it to 32-bits.

The 32-bit power values of each coupled channel is divided at 29,30 by truncated 16-bit power value of coupling channel, produced by divisor 28. The 16-bit resulting quotient is adjusted to 8 bits at 31,32 and used as index into a table 33,34 which stores the square root values for 0 to 255.

All adjustments made in mantissa is accounted for in the exponent, including—shift value (for coupled channel in question, and the coupling channel) used for normalising mantissa for power calculations, truncation of 40-bit product to 32-bit and adjustment for table lookup. Moreover, since equation for coupling co-ordinate requires square root of the power ratio and not of just the mantissa, the exponent value must be divided by two (equivalent to square root of an exponential). However a subtle point that is very important is that if the exponent value is an odd number, simply dividing by two will lead to erroneous result. In such case exponent must be incremented by one to make it an even number. To compensate for the increment, the mantissa is readjusted (shifted right by one bit).

Finally the mantissa and exponent are converted into the (4-bit for each) format required for transmission into AC-3 frame.

To sum up, power values necessary for coupling co-ordinate calculations are derived from 16-bit coefficients (obtained from normalisation followed by truncation of 32-bit coefficients). Square root of the ratio of power values is obtained for the mantissa part by a table look-up. The exponent, derived from shift values used for normalising coupling and coupled channel coefficients, is converted to an even number and divided by two. This together with the table look-up for mantissa is equivalent to square root of the actual power ratio in the floating point method used for calculating coupling co-ordinate.

The invention claimed is:

1. A coupling process for use in reduced bit processing, including calculating a power value of a coupled channel by normalizing frequency coefficients within a channel band to produce mantissas with respective normalization values represented by a prescribed reduced number of bits, calculating a sum of the square of the values and post-shifting the resultant sum to obtain a power value.

2. A method as claimed in claim 1, wherein the frequency coefficients are 32-bits and the prescribed reduced number of bits is 16.

3. A method as claimed in claim 1, wherein the power value of the coupled channel is divided by a power value of a coupling channel, having the prescribed reduced number of bits, to produce a mantissa quotient.

4. A method as claimed in claim 3, wherein the power value of the coupling channel is obtained by combining frequency coefficients within a channel band of said coupled channel and a second coupled channel, normalizing coefficient mantissas of the combined coefficients to produce mantissas with normalization values represented by the prescribed reduced number of bits, calculating a sum of the square of the values and representing the resultant sum of the coupling channel in a prescribed number of bits greater than the prescribed reduced number of bits.

5. A method as claimed in claim 3, wherein the quotient is indexed in a look-up table with an associated square root value of the quotient.

6. A method as claimed in claim 3, wherein the quotient is adjusted to eight bits for indexing in the look-up table.

7. A method as claimed in claim 3, wherein the power values of the coupled and coupling channels have respective coefficients, wherein exponents of each of the coefficients, corresponding to respective mantissas, are adjusted by normalizing the exponents to produce normalized exponents, truncating the normalized exponents to produce truncated exponents, and post-shifting the truncated exponents to produce adjusted exponents.

8. A method as claimed in claim 7, wherein the adjusted exponents of the coupled channel are subtracted by the adjusted exponents of the coupling channel to produce an exponent quotient and the square root of the exponent quotient is obtained.

9. A method as claimed in claim 8, wherein the exponent value of the exponent quotient is adjusted by 1 if the exponent value is odd and a corresponding shift is made in the associated quotient of the mantissas.

10. A method as claimed in claim 8, wherein the coupling coordinate is represented by the square root of the exponent quotient in combination with a square root value of the associated mantissa, obtained from the lookup table.

11. A method as claimed in claim 1, wherein a phase and coupling coefficient strategy of the coupling process are determined using the values of the normalized mantissas.

12. A signal processor for a coupling process having:

first and second coupled channel register;

a coupling channel means for combining frequency coefficients of the first and second coupled channel;

a coupling coordinate calculation means including:

normalization means for analyzing mantissas of the frequency coefficients in a channel band in each of the channels, the normalization means producing first normalization values for each respective channel represented by a prescribed number of reduced bits;

calculation means for determining a sum of the square of values for each channel;

shifting means for post-shifting each sum to obtain a power value for each of the channels;

divider means for providing a mantissa quotient by dividing the post shifted sum of the first and second coupled channels by the post shifted sum of the coupling channel, reduced to a prescribed number of reduced bits; and a lookup table for providing square root values of the mantissa quotients, the square root values representing a mantissa component of the coupling coordinate of each of the first and second coupled channels.

13. A signal processor as claimed in claim 12, wherein the registers provide 32 bit frequency coefficients and the normalization means output 16 bit values, corresponding to the prescribed number of reduced bits.

14. A signal processor as claimed in claim 12, including an exponent adjusting means for producing adjusted exponents for each frequency coefficient, of the respective coupled and coupling channels, in response to corresponding changes in the mantissa values resulting from the normalization means, calculation means and divider means;

an exponent calculation means for providing an exponent quotient for each of the coupled channels by respectively dividing the sum of the square of the adjusted exponents of each of the coupled channels by the sum of the square of the adjusted exponents of the coupled channel and taking the square root of the respective exponent quotients; and a coupling coefficient means for representing the coupling coefficient of each of the first and second coupled channels by combining the square root of the exponents for each of the coupled channels with the associated mantissa component.

15. A signal processor as claimed in claim 12 further including a phase and coupling coefficient generation strategy means for determining the phase and coupling coefficient strategy on the basis of the values of the normalized mantissas.

16. A signal processor for a coupling process for use with a first coupled channel, the signal processor comprising:

normalizing means for normalizing frequency coefficients of the coupled channel to produce mantissas with respective normalization values represented by a prescribed reduced number of bits;

calculating means for calculating a sum of the square of the values; and post-shifting means for post-shifting the resultant sum to obtain a power value of the coupled channel.

17. The signal processor of claim 16, wherein the frequency coefficients are 32-bits and the prescribed reduced number of bits is 16.

18. The signal processor of claim 16, further comprising divider means for proving a mantissa quotient by dividing the power value of the first coupled channel by a power value of a coupling channel, having the prescribed reduced number of bits.

19. The signal processor of claim 16, further comprising:

coupling channel means for combining frequency coefficients of the first coupled channel with respective frequency components of a second coupled channel to obtain frequency coefficients of a coupling channel, wherein the normalizing means normalizes the frequency coefficients of each of the channels to produce respective mantissas with respective normalization values represented by a prescribed reduced number of bits, the calculating means calculates respective sums of the square of the respective values for the channels, and the post-shifting means post-shifts the respective sums to obtain respective power values for the channels; and divider means for obtaining respective mantissa quotients for the first nad second channels by dividing each of the power values of the first and second channels by the power value for the coupling channel.

20. The signal processor of claim 16, further comprising:

a look-up table that provides square root values for the mantissa quotients.

* * * * *